Patented Oct. 1, 1929

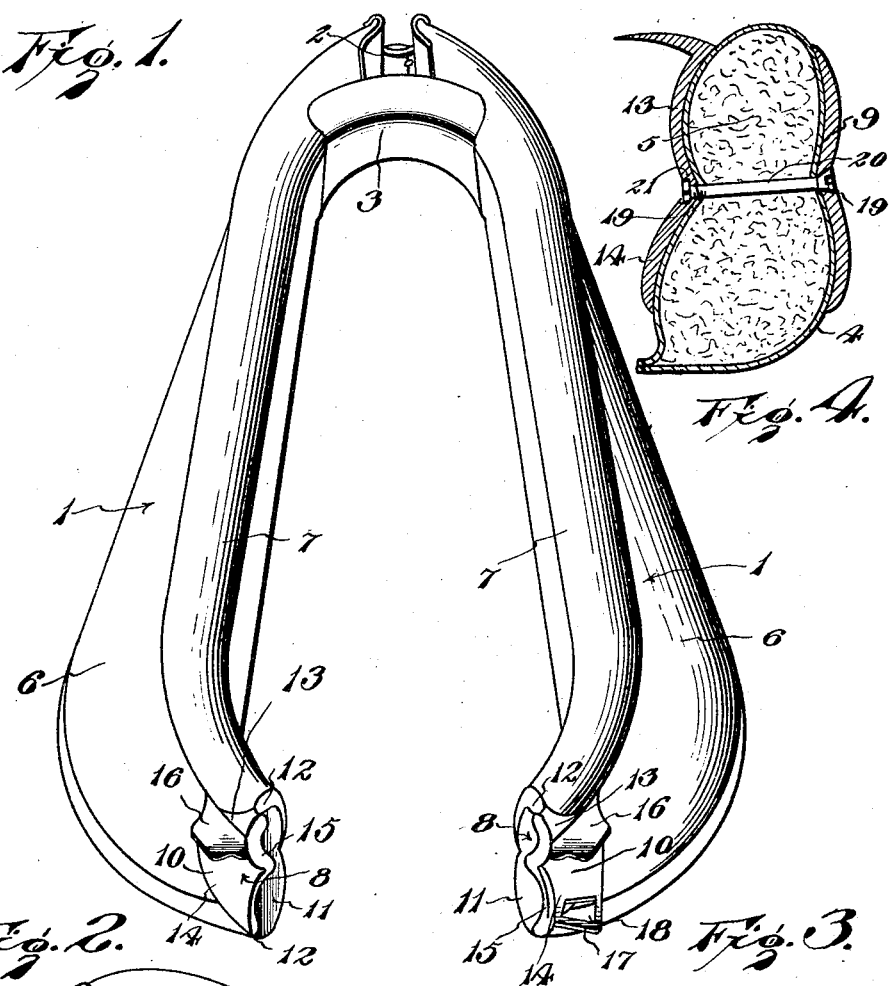
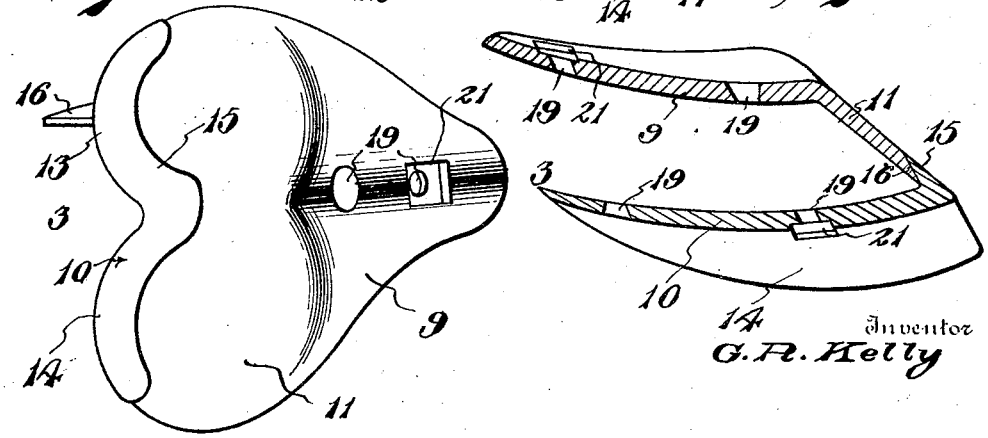

1,730,215

UNITED STATES PATENT OFFICE

GEORGE R. KELLY, OF DOVER, MISSOURI

HORSE COLLAR

Application filed April 5, 1928. Serial No. 267,613.

This invention relates to a horse collar and more particularly to caps secured upon the lower ends of companion side portions of the collar in capping relation thereto so that they will reinforce and protect the collar and prevent it from being quickly worn and frayed out.

One object of the invention is to provide caps which may be easily applied to the collar sections and firmly held in place thereon so that they cannot work loose.

Another object of the invention is to so form the caps that they will completely cover the lower end faces of the collar sections and extend along the inner and outer side faces thereof and conform to the contour of the collar sections so that they will be prevented from having movement which might tend to work them loose.

Another object of the invention is to form the caps of companion sections with portions which overlap so that they will be retained in proper relation to each other and prevented from slipping out of place.

Another object of the invention is to prevent securing bolts for the cap sections from working loose after being tightened.

The invention is illustrated in the accompanying drawing, wherein

Figure 1 is a perspective view of the improved collar;

Fig. 2 is an enlarged view showing one of the caps in end elevation;

Fig. 3 is a longitudinal sectional view through the cap taken on the line 3—3 of Fig. 2, and Fig. 4 is a transverse sectional view through one of the caps and the portion of the collar to which it is applied.

The collar consists of companion side members or portions 1 which are of a duplicate construction and have their upper ends joined by a strap 2 or other conventional means and one of them carries a shield 3 which is also of a conventional construction and provided so that the horse's neck will not be liable to be caught between the upper ends of the collar members when the collar is in use. Each of the collar members consists of a casing 4 formed of leather and stuffed with a filling 5 of straw or any other desired material which may be packed into the casing but will be sufficiently soft to make it unnecessary to use a pad with the collar. Each collar member is shaped by stitches or in any other desired manner to define a body portion 6 and a bead or shoulder 7 which extends longitudinally of the collar member at the junction of the outer wall and inner side wall of the collar member so that hames may fit upon the collar in the usual manner.

At their lower ends the collar members or side portions are formed with flat end faces, and in order to reinforce the lower ends of the collar members and retain the packing within the casing, there has been provided caps 8 which are formed of metal and fit upon the collar members in close contacting engagement therewith. Each of the caps comprises inner and outer sections 9 and 10 which are preferably of cast metal, although they may be formed of other materials found practical. The inner cap section 9 fits flatly against the inner side wall of the collar section to which it is applied and is formed with a base plate 11 which completely covers the lower end face of the cover section to which it is applied and is reduced intermediate its depth so that it will conform to the contour thereof, as shown in Figs. 1 and 2. The portion of the inner cap section which fits against the inner face of the collar member has its sides extended about the ends of the base plate 11 to provide upper and lower lips 12 which fit upon the collar above and below the end face thereof and serve to prevent the base plate from moving out of its proper position in covering relation to the lower end face of the collar section. It should also be noted that the portion of the cap section which fits against the inner surface of the collar member is slightly V-shaped in cross section, as shown in Figs. 3 and 4, so it will have snug fitting engagement with the collar and due to its contour be prevented from moving out of its proper position.

The outer cap section 10 tapers towards its upper end and is curved longitudinally so that it conforms to the longitudinal contour of the collar section to which it is applied. The upper and lower portions 13 and 14 of the outer cap section are curved transversely and diverge outwardly, as shown in Fig. 4, so that they fit snugly against the body portion and shoulder of the collar section and along its lower end the outer cap section is formed with a flange 15 which overlaps the base plate 11 of the inner cap section 9, as shown in Fig. 3. By referring to this figure, it will be seen that the flange 15 tapers towards its outer edge and the portion of the base plate which it overlaps is correspondingly beveled, as shown at 16, so that, when the two cap sections are in place, the outer surfaces of the base plate 11 and flange 15 will be substantially flush with each other. This provides a smooth surface for the lower end of the collar. Since the inner cap section is provided with the lips 12 which terminate close to the upper and lower ends of the flange 15, the extreme lower ends of the collar section will be completely enclosed and there will be no danger of the casing 4 slipping out of place beneath its protecting cap. A plate or tongue 16 projects from the upper portion 13 of each outer cap section to extend above the lower end portions of hames and one cap has its outer section extended downwardly to provide a tongue extension 17 having an opening formed therein to provide an eye 18 in which a choke strap may be engaged in the usual manner. Openings 19 are formed in the cap sections at the junction of their upper and lower portions to receive securing bolts 20 and certain of these openings are tapered inwardly to receive the heads of the bolts and the remaining openings have enlarged portions 21 which are rectangular in shape and intended to receive the securing nuts of the bolts in counter-sunk relation to the outer surfaces of the cap sections and serve to prevent the nuts from rotating. Therefore, the securing nuts will be locked in place and will not be liable to work loose from the bolts. By having the caps formed of companion sections constructed as set forth above and disclosed in the accompanying drawing, the lower ends of the two collar sections will be very well reinforced and prevented from being quickly worn out. While the caps have been illustrated as being formed of separate sections secured in operative relation to each other upon the collar by bolts, it will be understood that each cap could consist of a single casting or have its sections brazed or otherwise secured together before being applied to the collar.

Having thus described the invention, I claim:

1. A horse collar comprising companion side portions having separated lower ends and each having a flat lower end face, caps for the lower ends of the said collar portions entirely free from each other whereby the lower ends of the side portions of the collar may have movement relative to each other, each cap consisting of inner and outer sections fitting against the collar portion capped thereby and snugly engaging the same, one cap section having a plate extension at its lower end covering the lower end face of the collar portion and the other cap section having a flange along its lower edge overlapping the plate extension, and fasteners passed transversely through the collar portions and cap sections to secure the caps in place.

2. A horse collar comprising companion side portions having separated lower ends and each having a flat lower end face, caps for the lower ends of the said collar portions entirely free from each other whereby the lower ends of the side portions of the collar may have movement relative to each other, each cap consisting of inner and outer sections fitting against the collar portion capped thereby and snugly engaging the same, one cap section having a plate extension at its lower end covering the lower end face of the collar portion and the other cap section having a flange along its lower edge overlapping the plate extension, and bolts passed transversely through the collar portions and cap sections to retain the caps in place and having their heads and securing nuts seated in recesses formed in the cap sections to prevent the bolts from working loose.

3. A horse collar comprising companion side portions having separated lower ends and each having a flat lower end face, and caps for the lower ends of the collar portions covering the lower end faces and overlying the inner and outer side portions thereof and each including companion inner and outer sections removably secured to the collar portion capped thereby and having their lower ends overlapped, each cap being entirely free from the other whereby the lower ends of the side portions of the collar may have movement relative to each other.

4. A horse collar comprising companion side portions having connected upper ends and separated lower ends, caps for the lower ends of said collar portions entirely free from the other whereby the lower ends of the side portions of the collar may have movement relative to each other, each cap consisting of inner and outer sections fitting against inner and outer side faces of a collar member, one having a base portion covering the lower end face of the collar member and the other provided with a flange overlapping the base portion of the first section, and securing means for the cap sections passed transversely through the collar member and engaged with the cap sections.

5. A horse collar comprising companion side portions having connected upper ends and separated lower ends, the said members being each shaped to define a body portion and bead extending longitudinally thereof along the forward portion of its inner side and having a flat lower end face, caps for the lower end portions of said collar portions entirely free from the other whereby the lower ends of the side portions of the collar may have movement relative to each other, each cap consisting of companion inner and outer sections fitting against the inner and outer faces of the collar section capped thereby and shaped to conform to the contour of portions of the body and bead engaged thereby, the inner cap section having a base portion fitting flatly against the lower end face of the collar section in covering relation thereto and the other cap section having a flange overlapping said base portion, and fasteners for the cap sections passed through the collar member.

6. A horse collar comprising side portions having separated lower ends and each portion having a flat lower end face and being shaped in transverse section to define a body having a longitudinally extending bead at the junction of its outer surface and front edge of its inner side surface, caps for the lower ends of the said collar portions entirely free from each other whereby the lower ends of the side portions of the collar may have movement relative to each other, each cap consisting of inner and outer sections fitting against the inner and outer faces of the collar portion capped thereby and overlying adjacent portions of the bead and encircling the lower end thereof, a hames engaging lip projecting from the bead engaging portion of the outer cap section, the inner cap section having a base plate at its lower end covering the flat lower end of the collar portion and the outer cap section having a marginal flange projecting from its lower end and overlapping said base plate, and securing bolts passed transversely through the collar portions and cap sections and having their heads and nuts counter-sunk in the cap sections to prevent loosening of the bolts.

7. A horse collar comprising companion side portions having separated lower ends, and caps for the lower ends of the collar portions removably secured thereon and overlying the free end and inner and outer side portions thereof and each provided with portions to overlie hames disposed about the collar, each cap being entirely free from the other whereby the lower ends of the side portions of the collar may have movement relative to each other.

In testimony whereof I affix my signature.

GEORGE R. KELLY. [L. S.]